US012555616B2

(12) United States Patent
Lee (10) Patent No.: US 12,555,616 B2
(45) Date of Patent: Feb. 17, 2026

(54) MEMORY DEVICE FOR OUTPUTTING DATA AND METHOD OF OPERATING THE SAME

(71) Applicant: SK hynix Inc., Icheon-si (KR)

(72) Inventor: Su Han Lee, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 139 days.

(21) Appl. No.: 18/390,293

(22) Filed: Dec. 20, 2023

(65) Prior Publication Data

US 2025/0046349 A1 Feb. 6, 2025

(30) Foreign Application Priority Data

Jul. 31, 2023 (KR) .................. 10-2023-0099813

(51) Int. Cl.
*G11C 7/08* (2006.01)
*G11C 7/10* (2006.01)
*G11C 7/12* (2006.01)

(52) U.S. Cl.
CPC ............. *G11C 7/08* (2013.01); *G11C 7/106* (2013.01); *G11C 7/12* (2013.01)

(58) Field of Classification Search
CPC ....................................... G11C 7/12
See application file for complete search history.

(56) References Cited

U.S. PATENT DOCUMENTS

| 4,829,471 A | * | 5/1989 | Banerjee | G11C 7/103 340/9.1 |
| 6,049,492 A | * | 4/2000 | Vogelsang | G11C 7/12 365/196 |
| 2008/0094901 A1 | * | 4/2008 | Park | G11C 16/3418 365/185.12 |
| 2010/0019814 A1 | * | 1/2010 | Park | G11C 7/1066 327/162 |
| 2012/0008418 A1 | * | 1/2012 | Huh | G11C 16/32 365/185.25 |
| 2024/0071505 A1 | * | 2/2024 | Chen | G11C 11/5628 |

FOREIGN PATENT DOCUMENTS

| KR | 1020170130969 A | 11/2017 |
| KR | 1020200134570 A | 12/2020 |

* cited by examiner

*Primary Examiner* — Douglas King
(74) *Attorney, Agent, or Firm* — WILLIAM PARK AND ASSOCIATES LTD.

(57) ABSTRACT

A memory device for outputting data, and a method of operating the same, includes a cache latch group including a plurality of cache latches that are sequentially arranged, wherein a plurality of odd cache latches and a plurality of even cache latches that are included in the plurality of cache latches are alternately arranged. The memory device also includes a sense amplifier configured to be coupled to the plurality of odd cache latches through a first bit output line group and coupled to the plurality of even cache latches through a second bit output line group, alternately. The memory device additionally includes a bit output line selection circuit configured to alternately couple the sense amplifier to the first bit output line group and the second bit output line group in response to a bit output line selection signal.

15 Claims, 4 Drawing Sheets

MEMORY DEVICE FOR OUTPUTTING DATA AND METHOD OF OPERATING THE SAME

CROSS-REFERENCE TO RELATED APPLICATION

The present application claims priority under 35 U.S.C. § 119(a) to Korean patent application number 10-2023-0099813 filed on Jul. 31, 2023, in the Korean Intellectual Property Office, the entire disclosure of which is incorporated by reference herein.

BACKGROUND

1. Technical Field

Various embodiments of the present disclosure generally relate to a semiconductor device, and more particularly to a memory device for outputting read data to the outside of the memory device and a method of operating the memory device.

2. Related Art

Memory devices may be devices in which data is stored, and they may be classified as volatile memory devices or nonvolatile memory devices.

A memory device may perform a read operation of reading data stored in a memory cell. Further, the memory device may perform a data output operation of outputting the read data to an external device. For example, the read data may be stored in a cache latch, and the data stored in the cache latch may be output to bit output lines. A sense amplifier (sense amp) may sense data based on a voltage difference between the bit output lines and may output the sensed data to a data input/output line.

Meanwhile, during a process of outputting data, the bit output lines may be developed for a certain period of time so as to increase the voltage difference. After the voltage difference is sensed by the sense amplifier, the bit output lines may maintain a voltage level corresponding to a precharge voltage depending on a precharge operation.

SUMMARY

An embodiment of the present disclosure is directed to a memory device. The memory device may include: a cache latch group including a plurality of cache latches that are sequentially arranged, wherein a plurality of odd cache latches and a plurality of even cache latches that are included in the plurality of cache latches are alternately arranged; a sense amplifier configured to be coupled to the plurality of odd cache latches through a first bit output line group and coupled to the plurality of even cache latches through a second bit output line group, alternately; and a bit output line selection circuit configured to alternately couple the sense amplifier to the first bit output line group and the second bit output line group in response to a bit output line selection signal.

An embodiment of the present disclosure is directed to another memory device. The memory device may include: a plurality of odd cache latches configured to output data to a first bit output line group; a plurality of even cache latches configured to output data to a second bit output line group, wherein the individual even cache latches of the plurality of even cache latches are arranged alternately with the individual odd cache latches of the plurality of odd cache latches; a sense amplifier configured to be alternately coupled to the first bit output line group and the second bit output line group and configured to output data, obtained by sensing and amplifying a voltage difference of the coupled first bit output line group or the coupled second bit output line group, to a data input/output line; a first precharge circuit configured to precharge the first bit output line group while the sense amplifier is coupled to the second bit output line group; and a second precharge circuit configured to precharge the second bit output line group while the sense amplifier is coupled to the first bit output line group.

An embodiment of the present disclosure may directed to a method of operating a memory device. The method may include: coupling an odd cache latch to a first bit output line group in response to a first column selection signal; coupling the first bit output line group to a sense amplifier in response to a first bit output line selection signal; sensing a voltage difference of the first bit output line group through the sense amplifier in response to a strobe signal; outputting first data, obtained based on sensing the voltage difference of the first bit output line group, to a data input/output line; activating a precharge operation on the first bit output line group; coupling an even cache latch to a second bit output line group in response to a second column selection signal; coupling the second bit output line group to the sense amplifier in response to a second bit output line selection signal; sensing a voltage difference of the second bit output line group through the sense amplifier in response to the strobe signal; outputting second data, obtained based on sensing the voltage difference of the second bit output line group, to the data input/output line; and deactivating the precharge operation on the first bit output line group.

DETAILED DESCRIPTION

Specific structural or functional descriptions of embodiments of the present disclosure introduced in this specification or application are provided as examples to describe embodiments according to the concept of the present disclosure. The embodiments according to the concept of the present disclosure may be practiced in various forms and should not be construed as being limited to the embodiments described in the specification or application.

Various embodiments of the present disclosure are directed to a memory device that is capable of increasing the time during which a precharge operation is performed on bit output lines and a method of operating the memory device.

Figure 1:
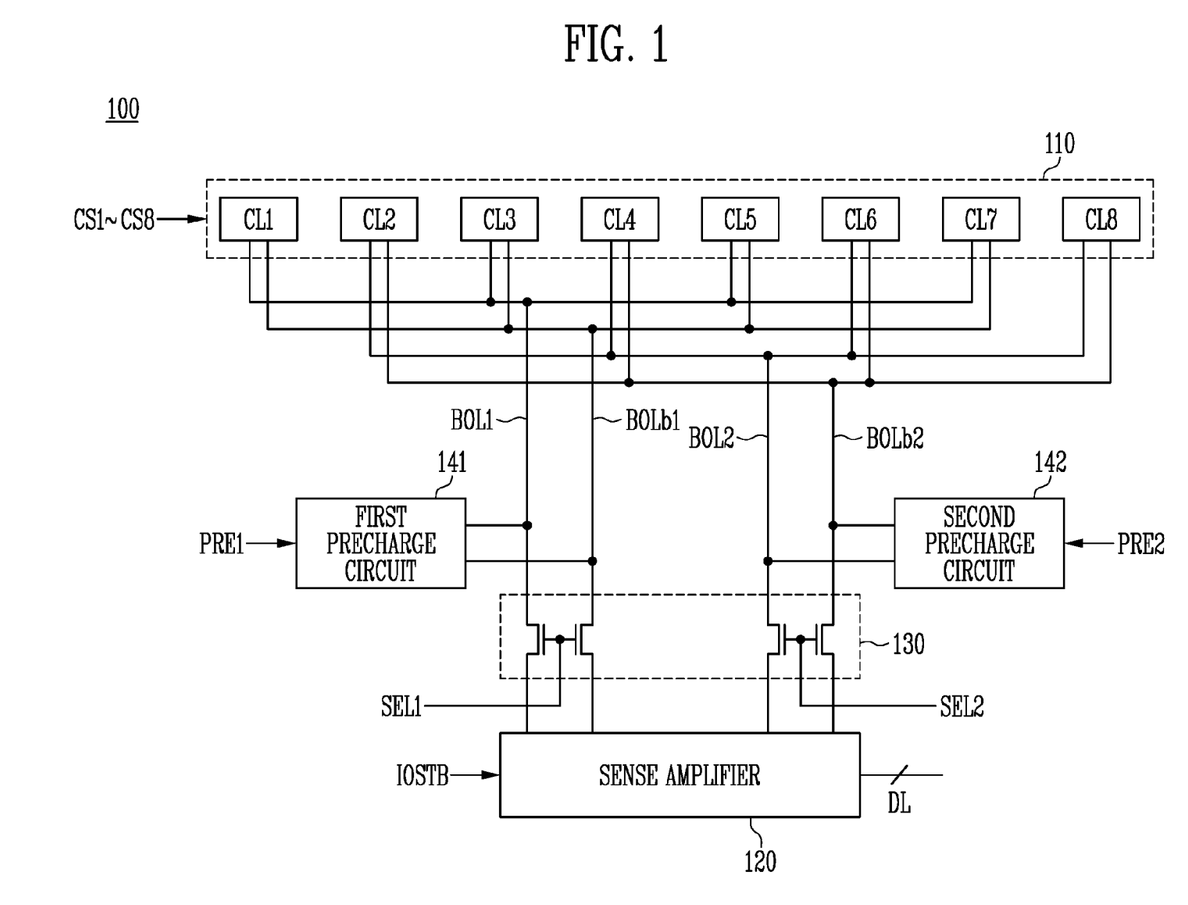
FIG. 1 is a diagram illustrating a memory device according to an embodiment of the present disclosure.

FIG. 1 is a diagram illustrating a memory device according to an embodiment of the present disclosure.

Referring to FIG. 1, a memory device 100 may include a cache latch group 110, a sense amplifier (sense amp) 120, a bit output line selection circuit 130, a first precharge circuit 141, and a second precharge circuit 142.

The cache latch group 110 may include a plurality of cache latches CL1 to CL8 that are sequentially arranged.

The plurality of cache latches CL1 to CL8 may temporarily store data read from memory cells.

In an embodiment, the plurality of cache latches CL1 to CL8 may include a plurality of odd cache latches CL1, CL3, CL5, and CL7 and a plurality of even cache latches CL2, CL4, CL6, and CL8. The plurality of odd cache latches CL1, CL3, CL5, and CL7 and the plurality of even cache latches CL2, CL4, CL6, and CL8 may be arranged alternately.

In an embodiment, the plurality of odd cache latches CL1, CL3, CL5, and CL7 may be latches arranged at odd-numbered positions among the plurality of cache latches CL1 to CL8. The plurality of odd cache latches CL1, CL3, CL5, and CL7 may be coupled to a first bit output line group. The plurality of odd cache latches CL1, CL3, CL5, and CL7 may output the stored data to the first bit output line group.

The first bit output line group may include a first bit output line BOL1 and a first inverted bit output line BOLb1.

In an embodiment, the first bit output line group may be coupled to an odd cache latch selected from among the plurality of odd cache latches CL1, CL3, CL5, and CL7 in response to a corresponding one of column selection signals CS1 to CS8. For example, when the column selection signal CS1 for selecting the first cache latch CL1 is input, the first bit output line group may be coupled to the first cache latch CL1. The remaining odd cache latches CL3, CL5, and CL7 may be coupled to the first bit output line group in the same manner as the first cache latch CL1.

In an embodiment, the plurality of even cache latches CL2, CL4, CL6, and CL8 may be latches arranged at even-numbered positions among the plurality of cache latches CL1 to CL8. The plurality of even cache latches CL2, CL4, CL6, and CL8 may be coupled to a second bit output line group.

The second bit output line group may include a second bit output line BOL2 and a second inverted bit output line BOLb2.

In an embodiment, the second bit output line group may be coupled to an even cache latch selected from among the plurality of even cache latches CL2, CL4, CL6, and CL8 in response to a corresponding one of the column selection signals CS1 to CS8. For example, when the column selection signal CS2 for selecting the second cache latch CL2 is input, the second bit output line group may be coupled to the second cache latch CL2. The remaining even cache latches CL4, CL6, and CL8 may be coupled to the second bit output line group in the same manner as the second cache latch CL2.

In an embodiment, the plurality of odd cache latches CL1, CL3, CL5, and CL7 and the plurality of even cache latches CL2, CL4, CL6, and CL8 may be sequentially selected in the order of arrangement. For example, in response to the column selection signals CS1 to CS8, the cache latches may be sequentially selected in the order of the first cache latch CL1 to the eighth cache latch CL8.

Meanwhile, although, in FIG. 1, it is described that the number of cache latches is 8, the present disclosure is not limited thereto. For example, the number of cache latches may be set to be less than 8 or greater than 8.

The sense amplifier 120 may be coupled to the plurality of odd cache latches CL1, CL3, CL5, and CL7 through the first bit output line group, or may be coupled to the plurality of even cache latches CL2, CL4, CL6, and CL8 through the second bit output line group.

The sense amplifier 120 may output data, obtained by sensing and amplifying the voltage difference of the first bit output line group or the second bit output line group, to a data input/output line DL in response to a strobe signal IOSTB. For example, when the sense amplifier 120 is coupled to the first bit output line group, the sense amplifier 120 may output first data, obtained by sensing and amplifying the voltage difference of the first bit output line group, in response to the strobe signal IOSTB. When the sense amplifier 120 is coupled to the second bit output line group, the sense amplifier 120 may output second data, obtained by sensing and amplifying the voltage difference of the second bit output line group, in response to the strobe signal IOSTB.

In an embodiment, the sense amplifier 120 may alternately sense the voltage difference of the first bit output line group and the voltage difference of the second bit output line group.

The bit output line selection circuit 130 may couple the sense amplifier 120 to the first bit output line group while a first bit output line selection signal SEL1 is activated. Further, the bit output line selection circuit 130 may couple the sense amplifier 120 to the second bit output line group while a second bit output line selection signal SEL2 is activated. In this way, the sense amplifier may be alternately coupled to either the first bit output line group or second bit output line group depending on which of the first bit output line selection signal SEL1 or the second bit output line selection signal SEL2 is activated.

In an embodiment, the bit output line selection circuit 130 may alternately couple the sense amplifier 120 to the first bit output line group and the second bit output line group in response to the bit output line selection signals SEL1 and SEL2.

After the voltage difference of the first bit output line group is sensed, the first precharge circuit 141 may precharge the first bit output line group in response to a first precharge signal.

In an embodiment, the first precharge circuit 141 may start precharging the first bit output line group after the first data is output in response to the strobe signal IOSTB.

In an embodiment, the first precharge circuit 141 may additionally precharge the first bit output line group while the sense amplifier 120 is coupled to the second bit output line group.

After the voltage difference of the second bit output line group is sensed, the second precharge circuit 142 may precharge the second bit output line group in response to a second precharge signal.

In an embodiment, the second precharge circuit 142 may start precharging the second bit output line group after the second data is output in response to the strobe signal IOSTB.

In an embodiment, the second precharge circuit 142 may additionally precharge the second bit output line group while the sense amplifier 120 is coupled to the first bit output line group.

Figure 2:
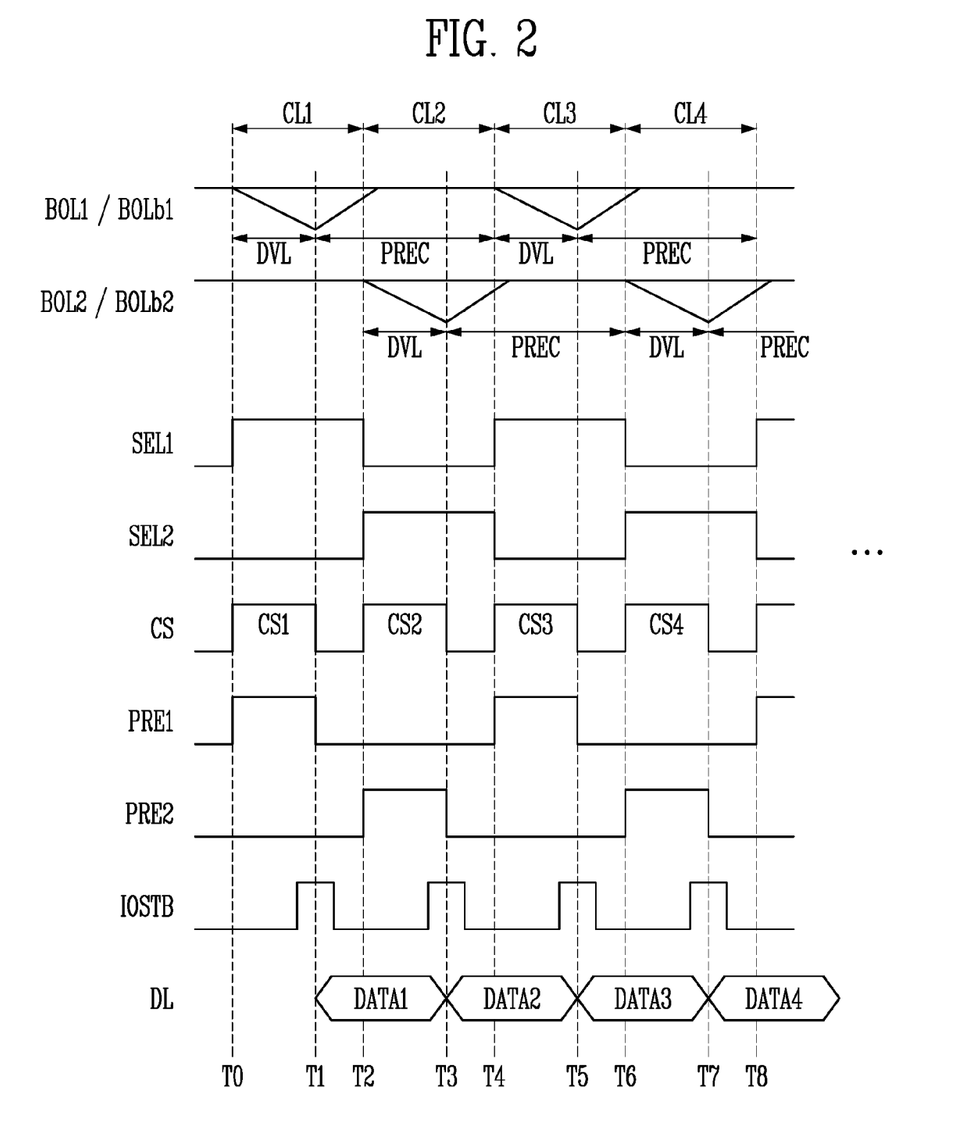
FIG. 2 is a diagram illustrating an example in which a memory device outputs data according to an embodiment of the present disclosure.

FIG. 2 is a diagram illustrating an example in which a memory device outputs data according to an embodiment of the present disclosure. In FIG. 2, an example in which data stored in first to fourth cache latches CL1 to CL4 is output is described for convenience of description. Therefore, the description of the first to fourth cache latches CL1 to CL4 may be equally applied to the fifth to eighth cache latches CL5 to CL8.

Referring to FIG. 2, at time T0, a first column selection signal CS1 may be activated. Accordingly, the first cache latch CL1 may be coupled to a first bit output line group.

Further, a first bit output line selection signal SEL1 may be activated. Accordingly, the sense amplifier 120 may be coupled to the first cache latch CL1 through the first bit output line group.

The first bit output line group may be developed for a certain period of time. A develop operation (DVL) may be an operation of increasing a voltage difference between a first bit output line BOL1 and a first inverted bit output line BOLb1. The develop operation (DVL) for the first bit output line group may be performed while the first column selection signal CS1 is activated.

At time T1, the first column selection signal CS1 may be deactivated.

Further, a strobe signal IOSTB may be activated. Accordingly, the sense amplifier 120 may sense the voltage difference of the developed first bit output line group. The sense amplifier 120 may output first data DATA1 to a data input/output line DL based on the sensed voltage difference.

Furthermore, a first precharge signal PRE1 may be transitioned to a low level. The first precharge circuit 141 may start precharging the first bit output line group in response to the first precharge signal PRE1. For example, the first precharge circuit 141 may apply a preset precharge voltage to the first bit output line BOL1 and the first inverted bit output line BOLb1. The first bit output line BOL1 and the first inverted bit output line BOLb1 may be precharged to a voltage level corresponding to the precharge voltage.

At time T2, a second column selection signal CS2 may be activated. Accordingly, the second cache latch CL2 may be coupled to a second bit output line group.

Furthermore, the first bit output line selection signal SEL1 may be deactivated, and the second bit output line selection signal SEL2 may be activated. Accordingly, the sense amplifier 120 may be decoupled from the first bit output line group and coupled to the second cache latch CL2 through the second bit output line group.

The second bit output line group may be developed for a certain period of time. A voltage difference between a second bit output line BOL2 and a second inverted bit output line BOLb2 may be increased. The develop operation (DVL) for the second bit output line group may be performed while the second column selection signal CS2 is activated.

In addition, the first precharge circuit 141 may additionally precharge the first bit output line group while the sense amplifier 120 is coupled to the second bit output line group. That is, because the first bit output line group is disconnected from the sense amplifier 120, the first bit output line group may continue to be precharged. Accordingly, the time during which the first bit output line group is precharged may be increased, and a sensing margin corresponding to the voltage difference of the first bit output line group may be improved.

At time T3, the second column selection signal CS2 may be deactivated.

Further, the strobe signal IOSTB may be activated. Accordingly, the sense amplifier 120 may sense the voltage difference of the developed second bit output line group. The sense amplifier 120 may output second data DATA2 to the data input/output line DL based on the sensed voltage difference.

Furthermore, a second precharge signal PRE2 may be transitioned to a low level. The second precharge circuit 142 may start precharging the second bit output line group in response to the second precharge signal PRE2. For example, the second precharge circuit 142 may apply a preset precharge voltage to the second bit output line BOL2 and the second inverted bit output line BOLb2. The second bit output line BOL2 and the second inverted bit output line BOLb2 may be precharged to a voltage level corresponding to the precharge voltage.

At time T4, the first precharge signal PRE1 may be transitioned to a high level. Accordingly, the first precharge circuit 141 may stop the supply of the precharge voltage to the first bit output line group.

A third column selection signal CS3 may be activated. Accordingly, the third cache latch CL3 may be coupled to the first bit output line group.

Furthermore, the second bit output line selection signal SEL2 may be deactivated, and the first bit output line selection signal SEL1 may be activated. Accordingly, the sense amplifier 120 may be decoupled from the second bit output line group and coupled to the third cache latch CL3 through the first bit output line group.

The first bit output line group may be developed for a certain period of time. The voltage difference between the first bit output line BOL1 and the first inverted bit output line BOLb1 may be increased. The develop operation (DVL) for the first bit output line group may be performed while the third column selection signal CS3 is activated.

In addition, the second precharge circuit 142 may additionally precharge the second bit output line group while the sense amplifier 120 is coupled to the first bit output line group. That is, because the second bit output line group is disconnected from the sense amplifier 120, the second bit output line group may continue to be precharged. Accordingly, the time during which the second bit output line group is precharged may be increased, and a sensing margin corresponding to the voltage difference of the second bit output line group may be improved.

At time T5, the third column selection signal CS3 may be deactivated.

Further, the strobe signal IOSTB may be activated.

Accordingly, the sense amplifier 120 may sense the voltage difference of the developed first bit output line group. The sense amplifier 120 may output third data DATA3 to the data input/output line DL based on the sensed voltage difference.

Furthermore, the first precharge signal PRE1 may be transitioned to a low level. The first precharge circuit 141 may start precharging the first bit output line group in response to the first precharge signal PRE1. For example, the first precharge circuit 141 may apply a preset precharge voltage to the first bit output line BOL1 and the first inverted bit output line BOLb1. The first bit output line BOL1 and the first inverted bit output line BOLb1 may be precharged to a voltage level corresponding to the precharge voltage.

At time T6, the second precharge signal PRE2 may be transitioned to a high level. Accordingly, the second precharge circuit 142 may stop the supply of the precharge voltage to the second bit output line group.

A fourth column selection signal CS4 may be activated. Accordingly, the fourth cache latch CL4 may be coupled to the second bit output line group.

Furthermore, the first bit output line selection signal SEL1 may be deactivated, and the second bit output line selection signal SEL2 may be activated. Accordingly, the sense amplifier 120 may be decoupled from the first bit output line group and coupled to the fourth cache latch CL4 through the second bit output line group.

The second bit output line group may be developed for a certain period of time. The voltage difference between the second bit output line BOL2 and the second inverted bit output line BOLb2 may be increased. The develop operation (DVL) for the second bit output line group may be performed while the fourth column selection signal CS4 is activated.

In addition, the first precharge circuit 141 may additionally precharge the first bit output line group while the sense amplifier 120 is coupled to the second bit output line group. That is, because the first bit output line group is disconnected from the sense amplifier 120, the first bit output line group may continue to be precharged.

At time T7, the fourth column selection signal CS4 may be deactivated.

Further, the strobe signal IOSTB may be activated. Accordingly, the sense amplifier 120 may sense the voltage difference of the developed second bit output line group. The sense amplifier 120 may output fourth data DATA4 to the data input/output line DL based on the sensed voltage difference.

Furthermore, the second precharge signal PRE2 may be transitioned to a low level. The second precharge circuit 142 may start precharging the second bit output line group in response to the second precharge signal PRE2. For example, the second precharge circuit 142 may apply a preset precharge voltage to the second bit output line BOL2 and the second inverted bit output line BOLb2. The second bit output line BOL2 and the second inverted bit output line BOLb2 may be precharged to a voltage level corresponding to the precharge voltage.

At time T8, the first precharge signal PRE1 may be transitioned to a high level. Accordingly, the first precharge circuit 141 may stop the supply of the precharge voltage to the first bit output line group.

Furthermore, the second bit output line selection signal SEL2 may be deactivated, and the first bit output line selection signal SEL1 may be activated.

In addition, the second precharge circuit 142 may additionally precharge the second bit output line group while the sense amplifier 120 is coupled to the first bit output line group. That is, because the second bit output line group is disconnected from the sense amplifier 120, the second bit output line group may continue to be precharged.

Figure 3:
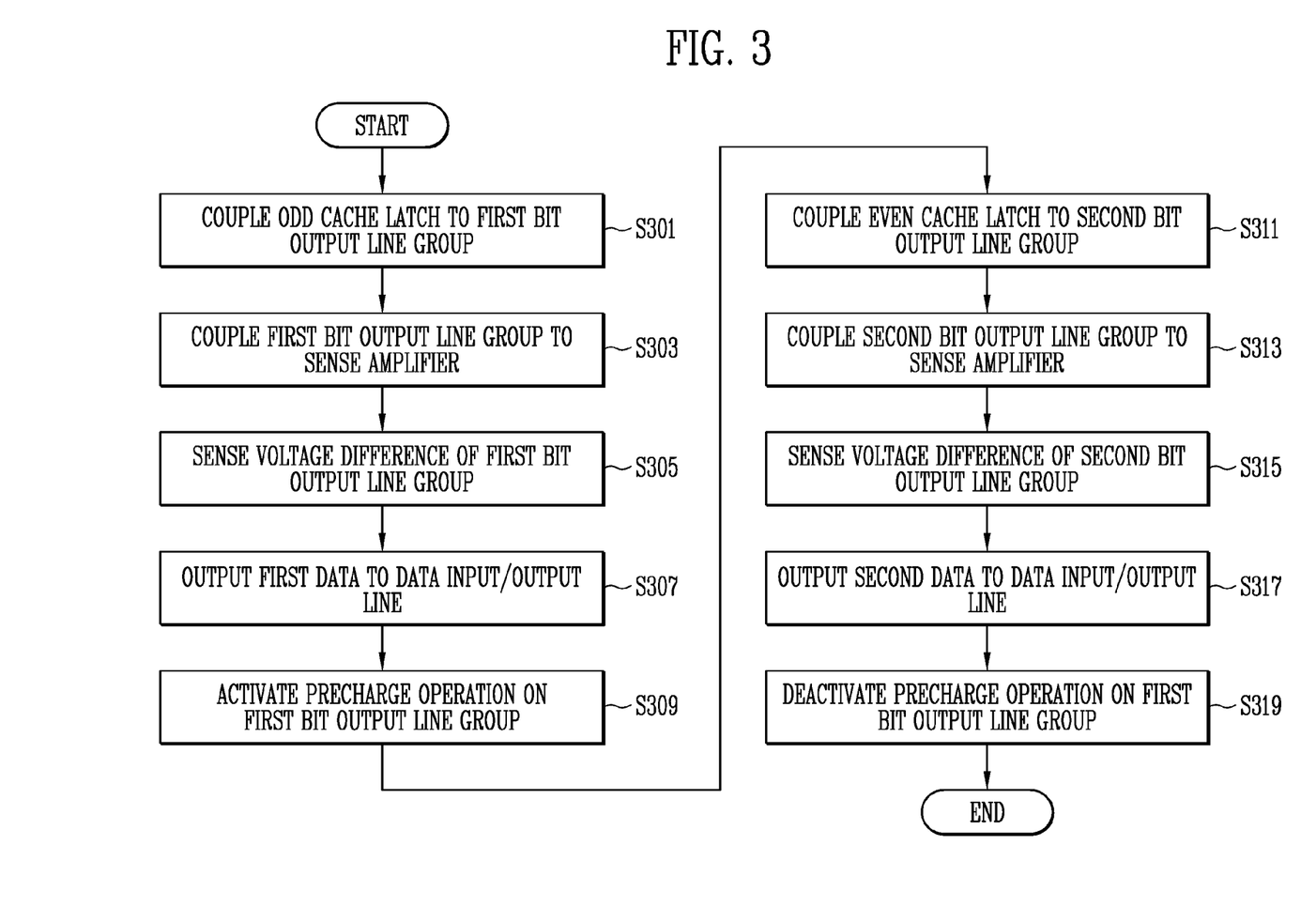
FIG. 3 is a flowchart illustrating a method of operating a memory device according to an embodiment of the present disclosure.

FIG. 3 is a flowchart illustrating a method of operating a memory device according to an embodiment of the present disclosure.

The method illustrated in FIG. 3 may be performed by, for example, the memory device illustrated in FIG. 1.

Referring to FIG. 3, at step S301, the memory device 100 may couple an odd cache latch to a first bit output line group in response to a first column selection signal.

At step S303, the memory device 100 may couple the first bit output line group to the sense amplifier 120 in response to a first bit output line selection signal.

At step S305, the memory device 100 may sense the voltage difference of the first bit output line group through the sense amplifier 120 in response to a strobe signal IOSTB.

At step S307, the memory device 100 may output first data obtained based on the voltage difference of the first bit output line group to a data input/output line DL.

At step S309, the memory device 100 may activate a precharge operation on the first bit output line group.

Here, the memory device 100 may apply a precharge voltage to the first bit output line group.

At step S311, the memory device 100 may couple an even cache latch to a second bit output line group in response to a second column selection signal.

At step S313, the memory device 100 may couple the second bit output line group to the sense amplifier 120 in response to a second bit output line selection signal. In an embodiment, the sense amplifier 120 is decoupled from the first bit output line group when it is coupled to the second bit output line group. Further, the sense amplifier 120 is decoupled from the second bit output line group when it is coupled to the first bit output line group.

At step S315, the memory device 100 may sense the voltage difference of the second bit output line group through the sense amplifier 120 in response to the strobe signal IOSTB.

At step S317, the memory device 100 may output second data obtained based on the voltage difference of the second bit output line group to the data input/output line DL.

At step S319, the memory device 100 may deactivate the precharge operation on the first bit output line group.

Here, the memory device 100 may stop the supply of the precharge voltage to the first bit output line group before the second bit output line selection signal is deactivated.

Figure 4:
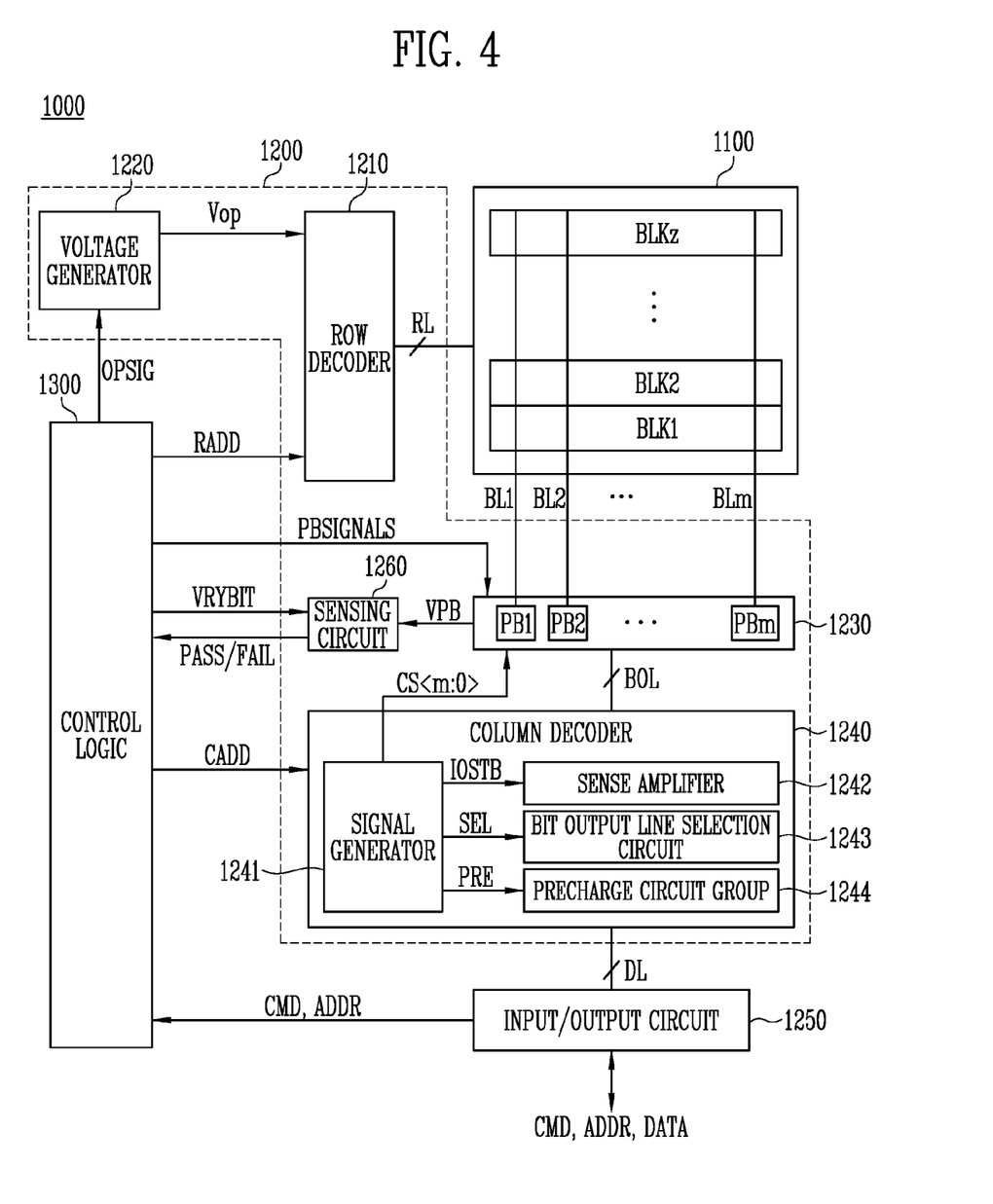
FIG. 4 is a diagram illustrating a memory device according to an embodiment of the present disclosure.

FIG. 4 is a diagram illustrating a memory device according to an embodiment of the present disclosure.

Referring to FIG. 4, a memory device 1000 may include a memory cell array 1100, a peripheral circuit 1200, and control logic 1300.

The memory cell array 1100 may include a plurality of memory blocks BLK1 to BLKz. The plurality of memory blocks BLK1 to BLKz may be coupled to a row decoder 1210 through row lines RL. The plurality of memory blocks BLK1 to BLKz may be coupled to a page buffer group 1230 through bit lines BL1 to BLm. Each of the memory blocks BLK1 to BLKz may include a plurality of memory cells in which data is stored. Each of the memory cells may store one or more data bits.

The peripheral circuit 1200 may apply various operating voltages to the row lines RL and the bit lines BL1 to BLm or discharge the applied voltages under the control of the control logic 1300.

The peripheral circuit 1200 may include the row decoder 1210, a voltage generator 1220, the page buffer group 1230, a column decoder 1240, an input/output circuit 1250, and a sensing circuit 1260.

The row decoder 1210 may decode a row address RADD received from the control logic 1300. The row decoder 1210 selects at least one of the memory blocks BLK1 to BLKz according to the decoded address. Further, the row decoder 1210 may select at least one word line of the selected memory block according to the decoded address so that voltages generated by the voltage generator 1220 are applied to the at least one word line.

The voltage generator 1220 may generate various operating voltages Vop such as a read voltage, a program voltage, a verify voltage, and a pass voltage using an external supply voltage supplied to the memory device 1000.

The page buffer group 1230 may include a plurality of page buffers PB1 to PBm. The plurality of page buffers PB1 to PBm may temporarily store data received through the plurality of bit lines BL1 to BLm in response to page buffer control signals PBSIGNALS. For example, the plurality of page buffers PB1 to PBm may temporarily store result values obtained by sensing the voltages or currents of the bit lines BL1 to BLm through a read operation. In this case, each of the plurality of page buffers PB1 to PBm may include a cache latch configured to temporarily store data. The cache latch may be any one of the plurality of cache latches CL1 to CL8 illustrated in FIG. 1.

In an embodiment, the plurality of page buffers PB1 to PBm may include a plurality of odd page buffers and a plurality of even page buffers. The plurality of odd page buffers may be page buffers arranged at odd-numbered positions, and may be coupled to first bit output lines among bit output lines BOL. The plurality of even page buffers may be page buffers arranged at even-numbered positions, and may be coupled to second bit output lines among the bit output lines BOL.

The column decoder 1240 may transfer data between the page buffer group 1230 and the input/output circuit 1250 in response to a column address CADD.

In an embodiment, the column decoder 1240 may include a signal generator 1241, a sense amplifier 1242, a bit output line selection circuit 1243, and a precharge circuit group 1244. The sense amplifier 1242, the bit output line selection circuit 1243 and the precharge circuit group 1244 may correspond to the sense amplifier 120, the bit output line selection circuit 130, the first precharge circuit 141, and the second precharge circuit 142 of FIG. 1.

The signal generator 1241 may generate a column selection signal CS<m:0> for selecting a page buffer which will output data from among the plurality of page buffers PB1 to PBm in response to the column address CADD. Accordingly, the page buffer selected from among the plurality of page buffers PB1 to PBm may be coupled to the bit output lines BOL. The bit output lines BOL may include the first bit output line group and the second bit output line group, described above with reference to FIG. 1.

Further, the signal generator 1241 may generate a strobe signal IOSTB for instructing the sense amplifier 1242 to sense the voltage difference of the bit output lines BOL. The sense amplifier 1242 may sense the voltage difference of the bit output lines BOL in response to the strobe signal.

Furthermore, the signal generator 1241 may generate a bit output line selection signal SEL for selecting the bit output lines BOL coupled to the sense amplifier 1242. The bit output line selection circuit 1243 may couple the bit output lines BOL selected in response to the bit output line selection signal SEL to the sense amplifier 1242. In an embodiment, the bit output line selection circuit 1243 may alternately couple the sense amplifier 1242 to the first bit output lines and the second bit output lines among the bit output lines BOL.

Also, the signal generator 1241 may generate a precharge signal PRE instructing the bit output lines BOL to be precharged. The precharge circuit group 1244 may precharge the bit output lines BOL in response to the precharge signal PRE. In an embodiment, a first precharge circuit included in the precharge circuit group 1244 may precharge the first bit output lines while the sense amplifier 1242 is coupled to the second bit output lines. Further, a second precharge circuit included in the precharge circuit group 1244 may precharge the second bit output lines while the sense amplifier 1242 is coupled to the first bit output lines.

The input/output circuit 1250 may transmit a command CMD and an address ADDR, received from an external memory controller (not illustrated), to the control logic 1300, or may exchange data DATA with the column decoder 1240.

During a verify operation, the sensing circuit 1260 may generate a reference current in response to an enable bit signal VRYBIT, and may compare a sensing voltage VPB received from the page buffer group 1230 with a reference voltage generated by the reference current and then output a pass signal PASS or a fail signal FAIL.

The control logic 1300 may control the peripheral circuit 1200 by outputting an operation signal OPSIG, the row address RADD, the page buffer control signals PBSIGNALS, and the enable bit signal VRYBIT in response to the command CMD and the address ADDR. Furthermore, the control logic 1300 may determine whether the verify operation has passed or failed in response to the pass or fail signal PASS or FAIL. The control logic 1300 may be implemented as hardware, software, or a combination of hardware and software. For example, the control logic 1300 may be a control logic circuit operating in accordance with an algorithm and/or a processor executing control logic code.

Included among teachings of the present disclosure are a memory device for which a sensing margin corresponding to a voltage difference between bit output lines is improved and a method of operating the memory device.

What is claimed is:

1. A memory device, comprising:
   a cache latch group including a plurality of cache latches that are sequentially arranged, wherein a plurality of odd cache latches and a plurality of even cache latches that are included in the plurality of cache latches are alternately arranged;
   a sense amplifier configured to be coupled to the plurality of odd cache latches through a first bit output line group and coupled to the plurality of even cache latches through a second bit output line group, alternately; and
   a bit output line selection circuit configured to alternately couple the sense amplifier to the first bit output line group and the second bit output line group in response to a bit output line selection signal,
   wherein the sense amplifier is configured to output data, obtained by sensing and amplifying a voltage difference of the first bit output line group or the second bit output line group, to a data input/output line in response to a strobe signal.

2. The memory device according to claim 1, wherein the memory device is configured such that:
   the first bit output line group is coupled to an odd cache latch selected from among the plurality of odd cache latches in response to a column selection signal, and
   the second bit output line group is coupled to an even cache latch selected from among the plurality of even cache latches in response to the column selection signal.

3. The memory device according to claim 2, wherein the plurality of odd cache latches and the plurality of even cache latches are configured to be sequentially selected in an order of arrangement.

4. The memory device according to claim 1, wherein the sense amplifier is configured to alternately sense the voltage difference of the first bit output line group and the voltage difference of the second bit output line group.

5. The memory device according to claim 4, further comprising:
   a first precharge circuit configured to precharge the first bit output line group after the voltage difference of the first bit output line group has been sensed in response to the strobe signal; and
   a second precharge circuit configured to precharge the second bit output line group after the voltage difference of the second bit output line group has been sensed in response to the strobe signal.

6. The memory device according to claim 5, wherein:
   the first precharge circuit is additionally configured to precharge the first bit output line group while the sense amplifier is coupled to the second bit output line group, and
   the second precharge circuit is additionally configured to precharge the second bit output line group while the sense amplifier is coupled to the first bit output line group.

7. A memory device, comprising:
a plurality of odd cache latches configured to output data to a first bit output line group;
a plurality of even cache latches configured to output data to a second bit output line group, wherein the individual even cache latches of the plurality of even cache latches are arranged alternately with the individual odd cache latches of the plurality of odd cache latches;
a sense amplifier configured to be alternately coupled to the first bit output line group and the second bit output line group and configured to output data, obtained by sensing and amplifying a voltage difference of the coupled first bit output line group or the coupled second bit output line group, to a data input/output line;
a first precharge circuit configured to precharge the first bit output line group while the sense amplifier is coupled to the second bit output line group; and
a second precharge circuit configured to precharge the second bit output line group while the sense amplifier is coupled to the first bit output line group.

8. The memory device according to claim 7, further comprising:
a bit output line selection circuit configured to couple the sense amplifier to the first bit output line group while a first bit output line selection signal is activated, and couple the sense amplifier to the second bit output line group while a second bit output line selection signal is activated.

9. The memory device according to claim 8, wherein the sense amplifier is configured to, when connected to the first bit output line group, output first data, obtained by sensing and amplifying a voltage difference of the first bit output line group, in response to a strobe signal.

10. The memory device according to claim 9, wherein the first precharge circuit is configured to start precharging the first bit output line group after the first data is output in response to the strobe signal.

11. The memory device according to claim 8, wherein the sense amplifier is configured to, when connected to the second bit output line group, output second data, obtained by sensing and amplifying a voltage difference of the second bit output line group, in response to a strobe signal.

12. The memory device according to claim 11, wherein the second precharge circuit is configured to start precharging the second bit output line group after the second data is output in response to the strobe signal.

13. A method of operating a memory device, comprising:
coupling an odd cache latch to a first bit output line group in response to a first column selection signal;
coupling the first bit output line group to a sense amplifier in response to a first bit output line selection signal;
sensing a voltage difference of the first bit output line group through the sense amplifier in response to a strobe signal;
outputting first data, obtained based on sensing the voltage difference of the first bit output line group, to a data input/output line;
activating a precharge operation on the first bit output line group;
coupling an even cache latch to a second bit output line group in response to a second column selection signal;
coupling the second bit output line group to the sense amplifier in response to a second bit output line selection signal;
sensing a voltage difference of the second bit output line group through the sense amplifier in response to the strobe signal;
outputting second data, obtained based on sensing the voltage difference of the second bit output line group, to the data input/output line; and
deactivating the precharge operation on the first bit output line group.

14. The method according to claim 13, wherein activating the precharge operation comprises:
applying a precharge voltage to the first bit output line group.

15. The method according to claim 14, wherein deactivating the precharge operation comprises:
before the second bit output line selection signal is deactivated, stopping supply of the precharge voltage to the first bit output line group.

* * * * *